Feb. 17, 1948. A. H. BENNETT 2,435,953
POLARIZING MICROSCOPE AND POLARIZING HAEMACYTOMETER THEREFOR
Filed Nov. 13, 1943 2 Sheets-Sheet 1
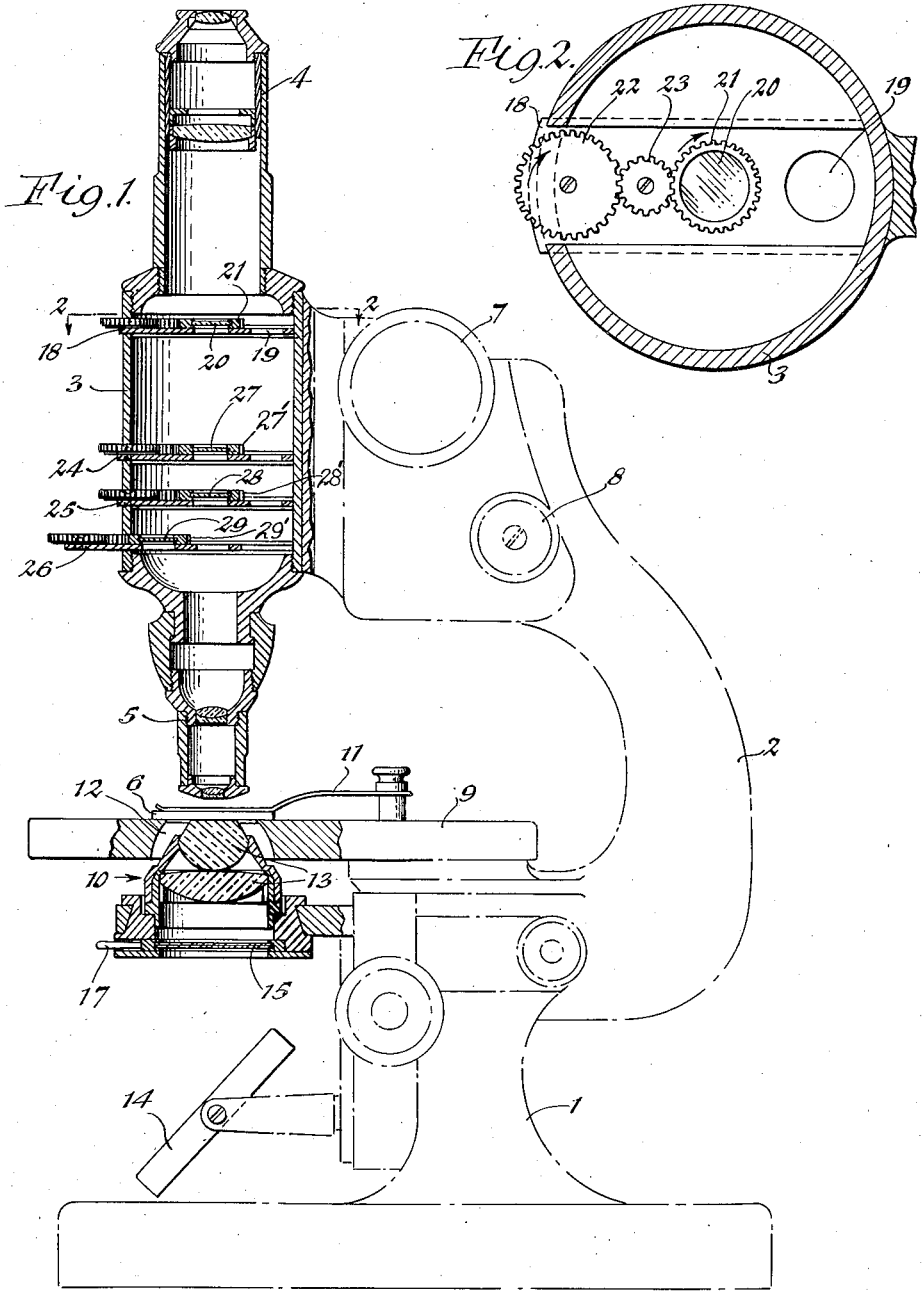
INVENTOR.
ALVA H. BENNETT
BY
ATTORNEY Feb. 17, 1948.  A. H. BENNETT  2,435,953
POLARIZING MICROSCOPE AND POLARIZING HAEMACYTOMETER THEREFOR
Filed Nov. 13, 1943  2 Sheets-Sheet 2
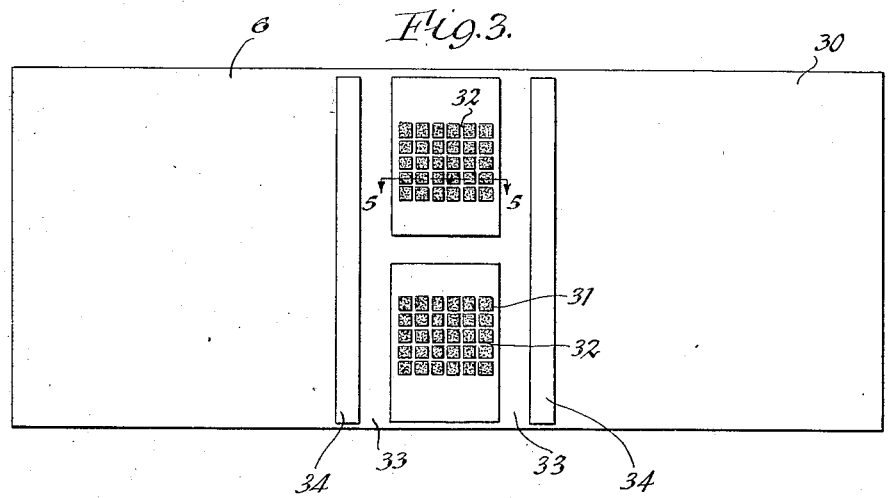
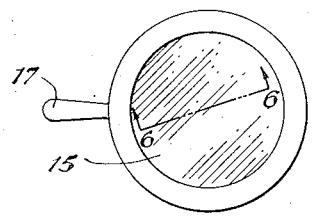
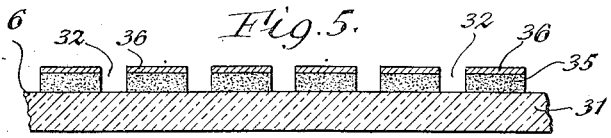
INVENTOR.
ALVA H. BENNETT
BY Raymond A. Faguin
ATTORNEY Patented Feb. 17, 1948

2,435,953

UNITED STATES PATENT OFFICE 2,435,953

POLARIZING MICROSCOPE AND POLARIZING HAEMACYTOMETER THEREFOR

Alva H. Bennett, Kenmore, N. Y., assignor, by mesne assignments, to American Optical Company, Southbridge, Mass., a voluntary association Application November 13, 1943, Serial No. 510,100

4 Claims. (Cl. 88—39)

This invention relates to optical counting devices for use with polarizing microscopes or the like.

An object of the invention is to provide an optical counting device having reference lines forming subdivided areas and which lines are distinguishable from the areas when viewed through the polarizing microscope or the like and which subdivided areas may be varied in intensity and wherein the background may be of a contrasting color to the color of the reference lines.

Another object of the invention is to provide an optical counting device having distinguishable reference lines forming subdivided areas which areas are colored for obtaining better contrast, when viewed through the polarizing microscope, with the objects to be counted thereon.

Another object of the invention is to provide an optical counting device having reference lines forming subdivided areas and which lines are distinguishable from the areas when viewed through the microscope and which areas may be colored or varied in color easily and quickly for varying the background of the counting chamber to obtain better contrast with the objects counted on said counting chamber.

Another object of the invention is to provide an optical counting device for use with the microscope or the like having reference lines forming subdivided areas and which lines are distinguishable from the areas when viewed through the microscope or the like and which subdivided areas may be varied in intensity and color to provide the desired contrast with the objects to be counted thereon.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawings:

Fig. 1 is a side view, partly in section of a polarizing microscope arrangement embodying the invention;

Fig. 2 is a sectional view taken on line 2—2 of Fig. 1 looking in the direction of the arrows;

Fig. 3 is a top or plan view of the microscope slide employed with the invention;

Fig. 4 is a top or plan view of one of the light modifying members employed in connection with the invention;

Fig. 5 is a sectional view taken on line 5—5 of Fig. 3 looking in the direction of the arrows; and Fig. 6 is a sectional view, on an enlarged scale taken on line 6—6 of Fig. 4.

Referring more particularly to the drawings wherein similar reference characters designate corresponding parts throughout the several views, the microscope shown in conjunction with the invention comprises the base 1 on which is supported the upright arm 2 which carries the microscope body tube 3, which body tube carries the eyepiece 4 and objective 5.

The body tube 3 is adapted to be adjusted vertically to adjust the eyepiece 4 and objective 5 relative to the microscope slide 6 by means of the coarse adjusting knob 7 and fine adjusting knob 8 which knobs adjust the body tube 3 in the usual manner.

The haemacytometer or slide 6 is supported on the microscope stage 9 and retained in aligned relation with the objective 5 and condenser 10 by means of the spring clip 11.

The stage 9 has the opening 12 in alignment with the objective 5 and over which opening is placed the microscope slide 6. Beneath the opening 12 in the stage 9 is positioned the condenser arrangement 12 containing usual condenser lenses 13 adapted to focus light from a light source which light is reflected by the adjustable reflector 14 through the said condenser whereby it is focused on to the slide 6.

In the lower portion of the condenser arrangement 10 is positioned the rotatable disc 15 adapted to be rotated by the handle 17 and containing a light polarizing material such as a Nicol prism or this member may be formed of a light polarizing film or sheet material which is commercially well known and which film is composed of a plastic base member containing large quantities of minute crystals which have their axes oriented, and this film may be positioned between glass discs if desired.

In the body tube 3 of the microscope is mounted a carrier or slide 18 having an opening therethrough 19 which may be aligned with the light path through the eyepiece 4, body tube 3 and objective 5 when desired. The slide or carrier 18 also contains an analyzing element 20 which may be a Nicol prism or a polarizing element such as previously described in connection with the member 15. The analyzer element 20 is rotatable with the gear 21 which is adapted to be rotated by means of the gear 22 through the gear 23. It will be seen that by rotating the gear 22 the analyzer member 20 may be rotated through any desired angle to vary the tint of the field being inspected such as the background afforded by the microscope slide 6 and the objects or bodies supported thereby.

Also slideably mounted in the body tube 3 are the slide members 24, 25 and 26. These members carry respectively rotatable gears 27', 28' and 29', similar to gear 21, and each of these last mentioned gears is adapted to be rotated through a pair of meshing gears similar to gears 22 and 23 as previously described in connection with the slide member 18. Instead of the analyzer element 20, the gears 27', 28' and 29' carry retardation or wave plates 27, 28 and 29 respectively. These plates 27, 28 and 29 may be alternately aligned with the light path of the microscope by sliding the slide containing said plate so that none of said plates may be aligned with said light path or any desired number thereof aligned as desired. In Fig. 1 the plates 27 and 28 in the slides 24 and 25 respectively are aligned with the light path while the plate 29 in the slide 26 is out of alignment with said light path.

The haemacytometer or counting chamber 6 as shown in detail in Figures 3 and 5 comprises a base portion 30 having the subdivided areas 31 which are subdivided or formed by the division lines 32 and surrounding these areas are the moats or the like 33 and supports 34 for supporting the cover glass, over the ruled areas.

The ruled areas may be formed by forming the blank or support 30 of glass or other suitable transparent material and then securing over a portion of the surface of the blank 30 a layer 35 of the light polarizing film as described above and then placing a thin layer or coating 36 of a low melting point glass or a glaze or the like, over the surface of said film 35 to protect the same if desired. Instead of this film of glass or glaze a coating of a sputtered or evaporated metal such as described in the patent to Ott 1,994,483 may be provided. The lines forming the subdivision lines 32 are then ruled through the layers 35 and 36 to form clearly distinguishable subdivisions or boundaries for the areas which are adapted to carry the objects to be counted. The layer 36 may also be formed of evaporated material such as quartz, magnesium fluoride, or other suitable material evaporated in a vacuum.

The retardation or wave plates 27, 28 and 29 consist of a birefringement crystal material such as quartz, calcite, selenite, mica, or other suitable material.

In practice the material carrying the objects to be counted such as blood where it is desired to count the corpuscles may be treated in the usual manner and then small quantities placed on the ruled areas and a cover glass placed thereover with the extension of the cover glass resting on the upper surface of the supports 34 to allow a layer of the blood of controlled thickness to remain between the cover glass and the upper surface of the layer 36, and the remainder is forced into the moats 33.

In order to vary the contrast between the background and the objects to be counted the polarizing member 15 and the analyzer 20 may then be adjusted to desired axial relation.

To further facilitate counting of the objects and to provide greater contrast between the objects to be counted one or more of the retardation plates 27, 28 and 29 is moved into the light path and the disc rotated to desired axial alignment.

It is pointed out that instead of forming the layer 35 of polarizing film that the crystals may be embedded directly in a glass layer or formed by other suitable processes, such as taught by Patent No. 2,387,308.

From the foregoing it will be seen that I have provided simple, efficient and economical means for obtaining all of the objects and advantages of the invention.

Having described my invention, I claim:

1. In apparatus of the character described, the combination with a microscope slide comprising a light polarizing transparent layer having a ruled area for facilitating counting the number of bodies overlying a unit area thereof, of eye lens means for viewing said slide, means for passing polarized light through said slide, an objective lens system for forming with said eye lens means a magnified image of the part of the slide thus illuminated, and analyzer for analyzing the light rays forming said image, a birefringent retardation plate and means for rotatably supporting said plate in the optical path between said slide and said analyzer for varying the tint of the image of said slide being viewed through said eye lens means.

2. In apparatus of the character described, the combination with a microscope slide comprising a light polarizing transparent layer having a ruled area for facilitating counting the number of bodies overlying a unit area thereof, of eye lens means for viewing said slide, means for passing polarized light through said slide, an objective lens system for forming with said eye lens means a magnified image of the part of the slide thus illuminated, an analyzer for analyzing the light rays forming said image, a plurality of birefringent retardation plates and a carrier rotatably mounting each retardation plate, each carrier being movable for shifting its respective plate into and out of operative position in the optical path between said slide and said analyzer and each carrier rotatably supporting its respective plate for rotation to vary the tint of the image formed of said slide when said plate is interposed in said optical path.

3. In apparatus of the character described, the combination with a microscope slide comprising a light polarizing transparent layer having a ruled area for facilitating counting the number of bodies on a unit area thereof, of magnifying means for viewing said ruled area, means for passing polarized light through said microscope slide, an analyzer for analyzing the light received from said slide, a birefringent retardation plate interposed between said slide and said analyzer for imparting a desired tint to the slide being viewed through said magnifying means.

4. In apparatus of the character described, the combination with a microscope slide comprising a light polarizing transparent layer having a ruled area for facilitating counting the number of bodies on a unit area thereof, of a polarizing microscope including means for supporting said slide for examination, means for passing polarized light through said slide, a lens system for viewing said ruled area comprising an objective and eye lens for forming an enlarged image of a part of the slide so illuminated, a tubular housing supporting said lens system, an analyzer, means for movably supporting said analyzer in said tubular housing in an operative position intersecting the light rays forming said image or in a retracted position in said housing out of the path of said light rays, means extending outwardly through an opening in said tubular housing for rotating said analyzer about an axis substantially parallel to the optical axis of said lens system when in said operative position, a birefrigent retardation plate, a carrier for supporting said retardation plate in said housing for transverse sliding movement into and out of an operative position intersecting said image forming rays, a rotatable supporting member arranged to mount said retardation plate on said carrier for rotation about an axis substantially parallel to the optical axis of said lens system, and actuating means mounted on said carrier for sliding movement therewith, said actuating means extending outwardly through an opening in said tubular housing and operatively connected with said rotatable supporting member for rotating said retardation plate from the exterior of said tubular housing when said retardation plate is located in said operative position.

ALVA H. BENNETT.

REFERENCES CITED

The following references are of record in the file of this patent:

UNITED STATES PATENTS

| Number | Name | Date |
|---|---|---|
| 1,430,765 | Spath | Oct. 3, 1922 |
| 1,978,434 | Maris | Oct. 30, 1934 |
| 1,994,483 | Ott | Mar. 19, 1935 |
| 2,078,181 | Land | Apr. 20, 1937 |
| 2,105,671 | Roesch | Jan. 18, 1938 |
| 2,128,394 | Berek | Aug. 30, 1938 |
| 2,152,513 | West | Mar. 28, 1939 |
| 2,218,875 | Parsell | Oct. 22, 1940 |
| 2,235,310 | Bausch | Mar. 18, 1941 |
| 2,309,626 | Conrad | Feb. 2, 1943 |
| 2,318,705 | Morgan | May 11, 1943 |
| 2,329,543 | Land | Sept. 14, 1943 |
| 2,330,718 | Kallmann | Sept. 28, 1943 |
| 2,347,582 | Ulffers | Apr. 25, 1944 |

FOREIGN PATENTS

| Number | Country | Date |
|---|---|---|
| 702,024 | Germany | Jan. 29, 1941 |

OTHER REFERENCES

"Die Optischen Instrumente"—Leiss; Verlag Von Wilhelm Engelmann, 1899; pages 174–179.

Carpenter, Text on the Microscope, 6th ed., 1881, pages 132, 133. Publ., by Churchill London, New Burlington St.